United States Patent [19]
Sato

[11] Patent Number: 5,322,240
[45] Date of Patent: Jun. 21, 1994

[54] FISHING REEL
[75] Inventor: Jun Sato, Sakai, Japan
[73] Assignee: Shimano Inc., Osaka, Japan
[21] Appl. No.: 829,329
[22] Filed: Feb. 3, 1992
[30] Foreign Application Priority Data
Feb. 4, 1991 [JP] Japan .................. 3-003647[U]
[51] Int. Cl.⁵ .................................. A01K 89/033
[52] U.S. Cl. ................................ 242/302; 242/295
[58] Field of Search ............ 242/295, 298, 301, 302, 242/285

[56] References Cited
U.S. PATENT DOCUMENTS

| | | | | |
|---|---|---|---|---|
| 1,981,429 | 11/1934 | Scott | ................ | 242/298 |
| 5,090,634 | 2/1992 | Kaneko | ................ | 242/268 |
| 5,145,125 | 9/1992 | Morimoto | ................ | 242/268 |
| 5,149,009 | 9/1992 | Sato | ................ | 242/290 |

FOREIGN PATENT DOCUMENTS 770657 3/1957 United Kingdom ............ 242/298

Primary Examiner—Katherine Matecki
Attorney, Agent, or Firm—Dickstein, Shapiro & Morin

[57] ABSTRACT

A fishing reel includes a spool for winding a fishing line, and a handle for rotating the spool in a line winding direction. The handle is connected to the spool through a handle shaft and a drive gear mounted on the handle shaft. A friction type rotation restrictor is mounted on the handle shaft between the drive gear and handle and linked to a reel body through a one-way clutch. The rotation restrictor prevents rotation in a line unwinding direction of the drive gear and spool against a tension applied to the fishing line and regardless of a stopping phase of the spool.

4 Claims, 4 Drawing Sheets

FISHING REEL

BACKGROUND OF THE INVENTION

1. Field of the Invention

The present invention relates to a fishing reel, and more particularly to a technique of preventing a line winding rotary element (spool) from rotating in a line unwinding direction when a tension acts on a fishing line.

2. Description of the Related Art

A known baitcasting reel, for example, has a ratchet type one-way clutch mounted on a handle shaft and including a wheel and a pawl, and a drag mechanism mounted in a transmission line between the handle shaft and the spool. With this type of reel, when a tension is applied to the fishing line, the one-way clutch prevents backward turning (which is turning in the line unwinding direction) of a handle, while the drag mechanism imparts a drag to check rotation of the spool in the line unwinding direction.

In the case of bait casting from a raft to catch black porgy or the like, the angler often places a fishing rod on a rod rest or the like and waits for a bite.

When the fishing rod is supported on a rod rest or the like, as distinct from holding the fishing rod in the angler's hands, a bite is visually perceived from variations in bending amount of the tip of the fishing rod caused by vibrations and the like occurring when a fish bites a bait.

For fishing in this mode to catch black porgy, for example, the tension of the fishing line is set so that the tip of the fishing rod is slightly bent (about several centimeters). This is achieved by taking up the fishing line with part of the bait contacting the seabed.

With such a tension acting on the fishing line, even a slight bite is discernible with certainty to enable the angler to take suitable action. However, with the reel having a ratchet type one-way clutch as noted above, rotation of the spool cannot be checked when the spool is in a phase corresponding to a position between adjacent teeth on the wheel. It is therefore difficult to effect fine adjustment of the tension acting on the fishing line.

Particularly in the case of fishing from a raft, the distance between the raft and seabed is variable with rise and fall of the tide. The tension of the fishing line must therefore be maintained constant by frequently changing the winding amount of the fishing line. Such an operation also is difficult with conventional reels, and there is room for improvement.

SUMMARY OF THE INVENTION

The object of the present invention is to provide an improved fishing reel which allows the tension applied to the fishing line to be fine-adjusted with ease by setting an amount of rotation of a rotary element, and facilitates a line winding operation.

The above object is fulfilled, according to the present invention, by a fishing reel comprising a rotary element for winding a fishing line; wind-up means for rotating the rotary element in a line winding direction; a driving rotation element connected to the wind-up means through a transmission system to be operable by the wind-up means to drive the rotary element; and a rotation restrictor linked to a reel body through a one-way clutch for producing a rotation restricting force to prevent rotation in a line unwinding direction of the driving rotation element and a handle shaft against a tension applied to the fishing line and regardless of a stopping phase of the rotary element.

This construction has the following function and effect.

When the rotary element is rotated in the line winding direction, the one-way clutch allows the handle shaft and rotation restrictor to rotate together. Conversely, when a force is applied to rotate the rotary element in the line unwinding direction, the one-way clutch linked to the reel body prevents rotation of the rotation restrictor and rotary element.

Thus, the rotation restrictor performs a function to restrict rotation in the line unwinding direction regardless of a stopping phase of the rotary element. Since the one-way clutch is a rolling type clutch, as distinct from the conventional ratchet type one-way clutch, the rotary element in any stopping phase may be held against rotation.

A tension adjusting operation may be carried out as follows.

Where the fishing reel is constructed as shown in FIG. 1, the tension acting on the fishing line may be adjusted by turning the wind-up means 8 while visually observing bending of the tip of the fishing rod. The winding operation is stopped when the tip of the fishing rod is bent to a desired degree. Then, the rotary element 6 is stopped by the rotation restrictor B and one-way clutch 30 in a position balanced against the tension applied to the fishing line, with the tension maintained as it is.

Thus, the fishing reel according to the present invention has improved operability to facilitate correct adjustment of the tension acting on the fishing line at a fishing time.

In a preferred embodiment of the present invention, the one-way clutch is a coil spring type one-way clutch mounted between a support element fixed to the reel body and a rotatable element of the rotation restrictor.

This construction has the following function and effect.

As does the above rolling type one-way clutch, the coil spring type one-way clutch allows the rotary element to rotate in the line winding direction and prevents the rotary element from rotating in the line unwinding direction. The rotary element may be stopped rotating regardless of its rotational phase.

Thus, the fishing reel in this embodiment also facilitates correct adjustment of the tension acting on the fishing line at a fishing time. This fishing reel has a further advantage of operating the rotary element smoothly and free from the rotation restricting force of the rotation restrictor at a line winding time.

Moreover, the coil spring type one-way clutch may have a simpler construction than the rolling type one-way clutch which includes balls or rollers mounted between inner and outer races. The simpler construction provides an advantage from the viewpoint of manufacture.

Other features and advantages of the present invention will be apparent from the following description.

DETAILED DESCRIPTION OF THE PREFERRED EMBODIMENTS

A fishing reel embodying the present invention will be described in detail hereinafter with reference to the drawings.

Figure 1:
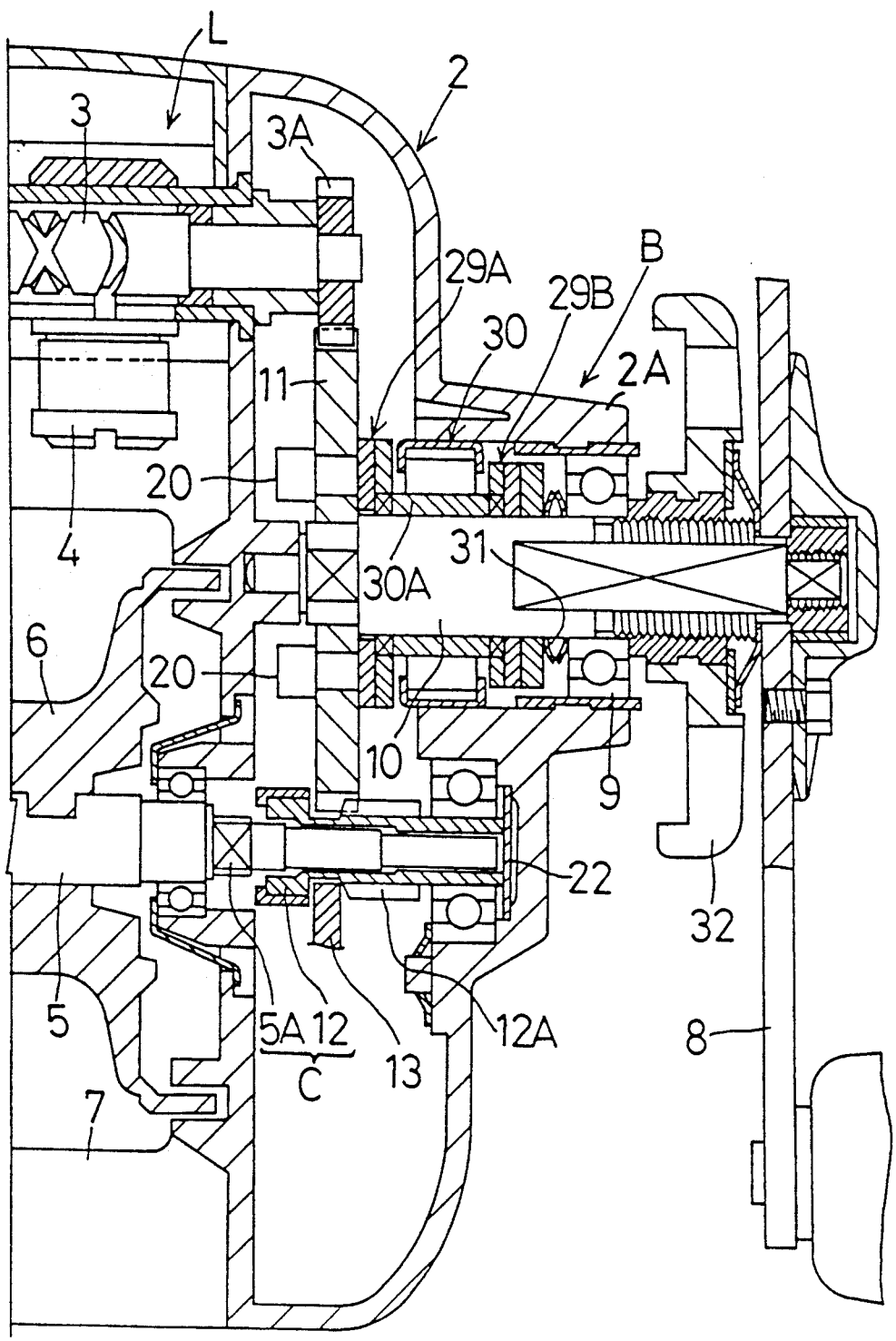
FIG. 1 is a view in vertical section of a righthand half of a reel body.
Figure 2:
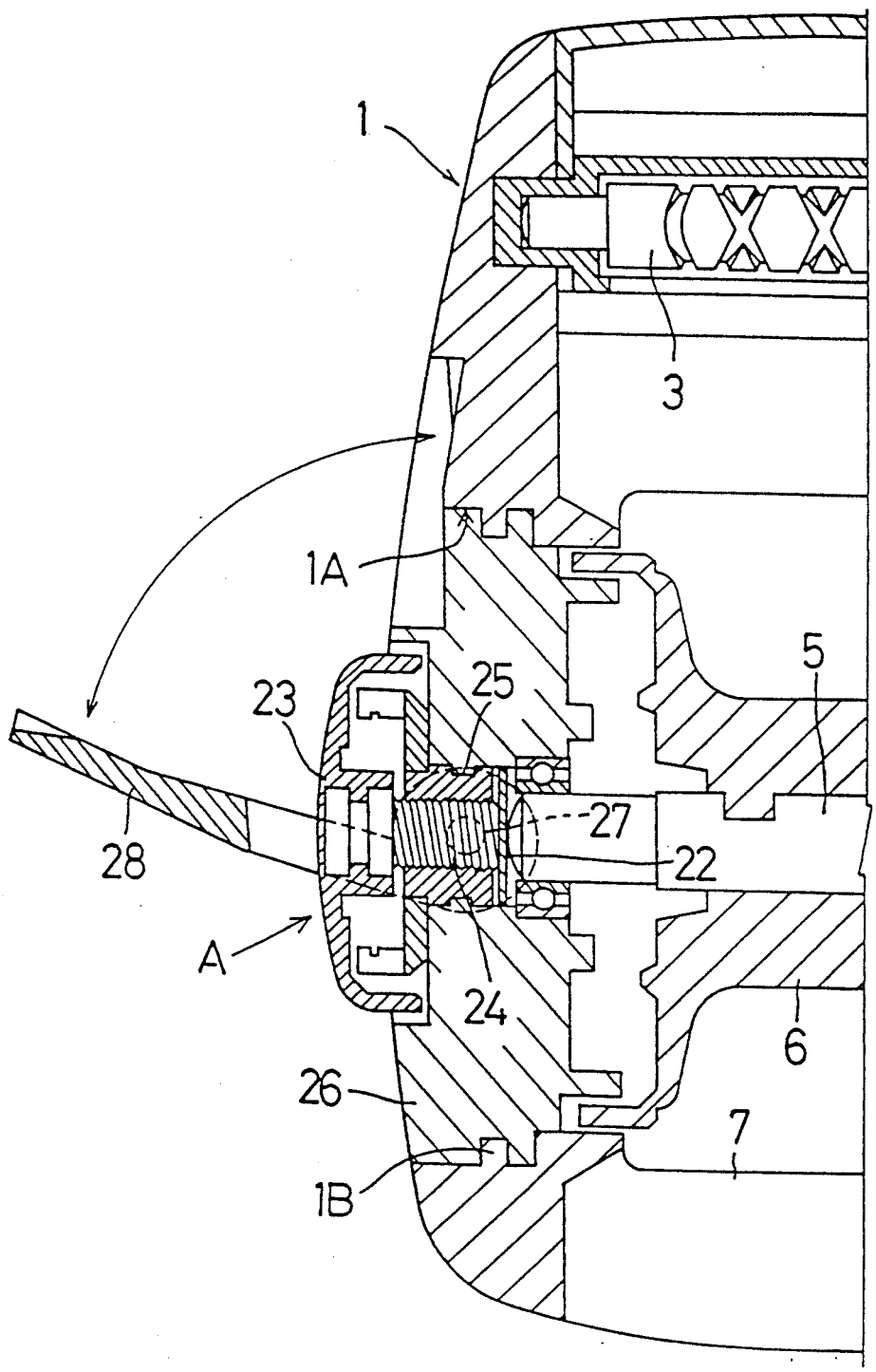
FIG. 2 is a view in vertical section of a lefthand half of the reel body.
Figure 3:
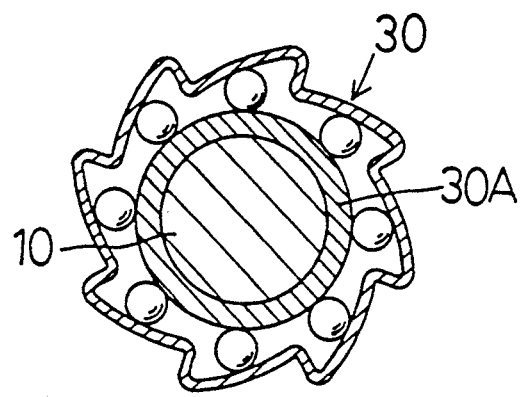
FIG. 3 is a sectional view of a one-way clutch seen from a handle.

As shown in FIGS. 1 and 2, a baitcasting reel includes a left body member 1 and a right body member 2 forming a reel body. Between the two body members 1 and 2 are a level wind mechanism L including a screw shaft 3 and a line guide 4, a spool 6 (one example of rotary elements) rotatable with a spool shaft 5, and a thumb rest 7. The left body member 1 includes a cast control mechanism A. The right body member 2 includes a line winding control system for transmitting an operating force from a handle 8 (one example of wind-up means) to the spool 6, and a clutch mechanism C for breaking transmission through the winding control system to allow free rotation of the spool 6.

As shown in FIG. 1, the right body member 2 supports a handle shaft 10 through a ball bearing 9. The handle shaft 10 carries the handle 8 and a transmission gear 11 acting as a driving rotation element. The transmission gear 11 is meshed with an input gear 3A of the screw shaft 3, and an input gear 12A of a clutch sleeve 12 described hereunder.

Figure 4:
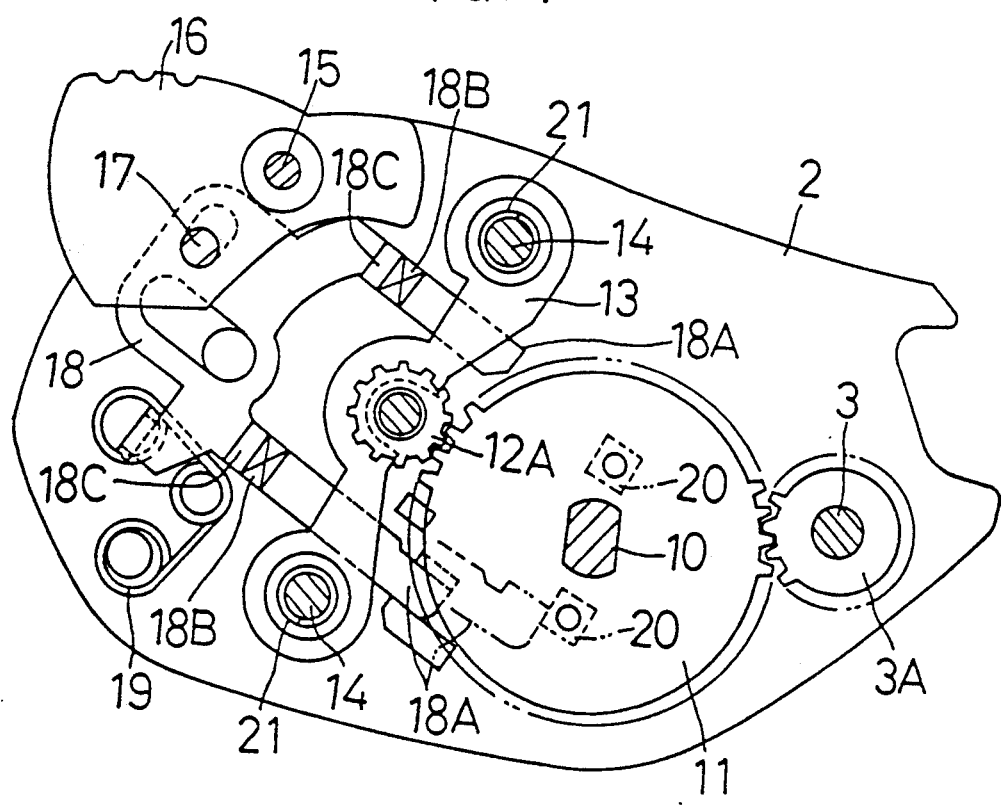
FIG. 4 is a sectional view showing an interior structure of a right side case.

The clutch sleeve 12 is slidably mounted on the spool shaft 5 for engaging an engaging element 5A formed on the spool shaft 5. The clutch sleeve 12 is slidable by a shifter 13 supported on a pair of support shafts 14 as shown in FIG. 4.

The engaging element 5A and clutch sleeve 12 constitute the clutch mechanism C. The right body member 2 contains a clutch controller 16 oscillatable about a shaft 15, and a control plate 18 slidable by a force transmitted thereto through a pin 17 formed on the clutch controller 16.

The control plate 18 includes forks 18A defining inclined cam surfaces 18B for operating the shifter 13 to a declutching position, and projecting surfaces 18C continuous with the cam surfaces 18B. When the clutch controller 16 is pressed, the cam surfaces 18B and projecting surfaces 18C act to operate the clutch sleeve 12 through the shifter 13, thereby setting the clutch sleeve 12 to the declutching position. A toggle spring 19 is provided to maintain this state. When, in this state, the handle 8 is turned in a line winding direction, contact pins 20 formed on the transmission gear 11 contact the forks 18A of the control plate 18. As a result, the control plate 18 is moved in a clutch engaging direction beyond a dead point of the toggle spring 19, whereby the control plate 18 is operated to a stroke end. The shifter 13 is operable, under an urging force of compression springs 21 mounted on the support shafts 14, respectively, to move the clutch sleeve 12 to a position to engage the engaging element 5A.

As shown in FIG. 2, the cast control mechanism A includes a dial 23 for operating a screw 24 meshed with a nut 25 to adjust pressure of plates 22 applied to opposite ends of the spool shaft 5. This cast control mechanism A is attached to a lid 26 for closing an opening 1A formed in the left body member 1 for pulling out the spool 6. The lid 26 is engageable with and disengageable from claws 1B of the left body member 1 by pulling out and turning a knob 28 pivotable about an axis 27.

As shown in FIG. 1, this reel includes a friction type rotation restrictor B mounted on the handle shaft 10. This rotation restrictor B is operable, regardless of a rotational phase of the spool 6, to prevent rotation of the spool 6 in a line unwinding direction against a relatively minor tension (a tension more or less corresponding to a bait weight) acting on the fishing line.

Details of the rotation restrictor B will be described next.

The handle shaft 10 carries, freely rotatably mounted thereon, a first frictional retaining mechanism 29A for contacting a side surface of the transmission gear 11 contained in the right body member 2, and a second frictional retaining mechanism 29B between the first frictional retaining mechanism 29A and handle 8. An inner race 30A of a rolling type one-way clutch 30 described hereunder is disposed between the first and second frictional retaining mechanisms 29A and 29B for transmitting a frictional retaining force from the second frictional retaining mechanism 29B to the first frictional retaining mechanism 29A. The rotation restrictor B further includes a disk spring 31, the ball bearing 9 and a screw type friction adjuster 32 arranged in the stated order from the second frictional retaining mechanism 29 to the handle 8. By turning and screw-feeding the adjuster 32, adjustment may be effected to the degree of pressure contact among the transmission gear 11, handle shaft 10 and inner race 30A. The rolling type one-way clutch 30 including the inner race 30A is provided between the handle shaft 10 and a boss 2A of the right body member 2 to prevent the handle shaft 10 from rotating in the line unwinding direction.

In use, a bait is cast with the clutch mechanism C disengaged. After the bait reaches the seabed, the clutch mechanism C is engaged and the handle 8 is turned in the line winding direction. When a tension has been set to the fishing line so that the tip of a fishing rod (not shown) is slightly bent, the angler may release the handle 8. Rotation of the spool 6 is stopped by the rotation restrictor B and one-way clutch 30, to maintain the fishing line in appropriate tension.

The rotation restrictor B has a restricting force adjustable by a screw feed operation of the adjuster 32. This adjuster 32 need not be loosened for a line winding operation since the restricting force is not applied to the handle shaft 10 at a line winding time.

The above embodiment may be modified as follows:

(1) The rotation restrictor B may include one of the frictional retaining mechanisms 29A and 29B instead of both. The adjuster 32 may be simply rotatable instead of being the screw feed type. In this case, a cam mechanism may be interposed between the ball bearing 9 and adjuster 32 to vary the frictional retaining force of the frictional retaining mechanism 29A.

(2) The roller type one-way clutch 30 may comprise a varied type such as a ball type, or a taper roller type as described in Japanese Patent Publication No. 1989-33692.

Figure 5:
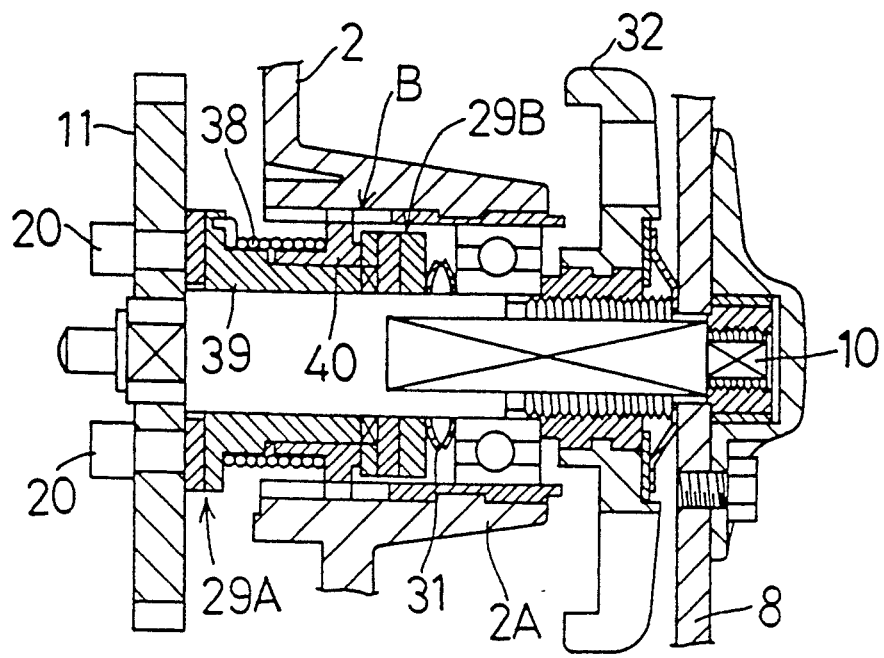
FIG. 5 is a view in vertical section of a modified construction.
Figure 6:
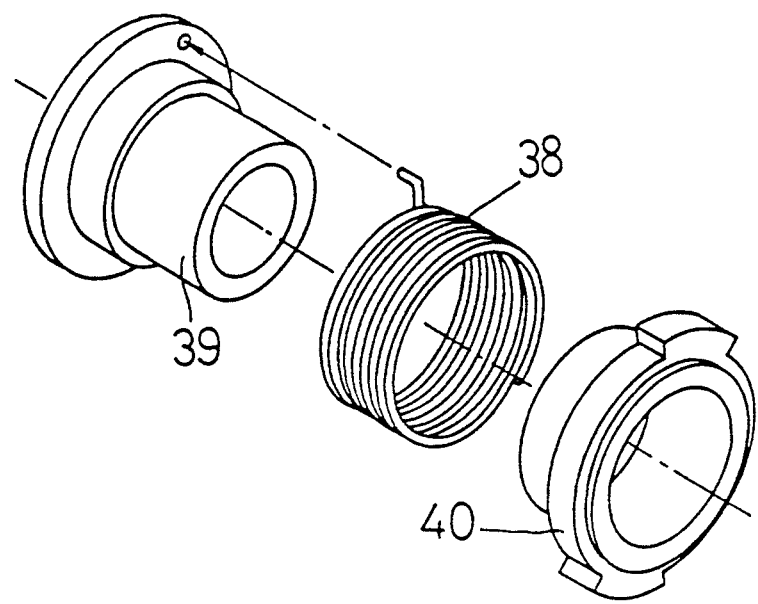
FIG. 6 is a perspective view of the construction shown in FIG. 5.

(3) A mounting structure for a coil spring type one-way clutch 38 will be described now. As shown in FIGS. 5 and 6, the first frictional retaining mechanism 29A and the second frictional retaining mechanism 29B are freely rotatably mounted on the handle shaft 10. The coil spring type one-way clutch 38 is mounted between a rotatable element 39 of the rotation restrictor B and an intermediate element 40 fixed to an inner wall of the boss 2A of the reel body 2. This one-way clutch 30 has one end thereof fixed to the rotatable element 39, and the other end wound in a free state on the intermediate element 40. When the handle 8 is turned in the line unwinding direction, the coil spring is tightened to rigidly interconnect the rotatable element 39 and intermediate element 40, thereby restricting rotation in the line unwinding direction of the handle shaft 10, spool 6 and rotation restrictor B. When the handle 8 is turned in the line winding direction, the coil spring becomes loose to allow relative rotation between the rotatable element 39 and intermediate element 40. As a result, the handle shaft 10, spool 6 and rotation restrictor B rotate in the line winding direction.

What is claimed is:

1. A fishing reel comprising;

a reel body;

a rotary element for winding a fishing line, said rotary element being located within said reel body;

wind-up means for providing an operating force for rotating said rotary element;

a driving rotation element for rotating said rotary element, and a handle shaft for connecting said driving rotation element to said wind-up means; and rotation restricting means for restricting rotation of said driving rotation element, said rotation restricting means including a one-way clutch, a first frictional retaining mechanism and a friction adjuster, said one-way clutch having an inner race and an outer race, said frictional retaining mechanism being disposed between said inner race and said driving rotation element, said inner race being rotatably fitted on said handle shaft, said outer race being located within said reel body and being non-rotatable relative to said reel body;

said friction adjuster being movable between first and second positions, said driving rotation element and said inner race being frictionally interconnected by said frictional retaining mechanism when said friction adjuster is in said first position, such that said driving rotation element and said inner race are prevented from rotating in a line feeding-out direction by said one-way clutch when said friction adjuster is in said first position, and wherein said driving rotation element and said inner race are not frictionally interconnected by said frictional retaining mechanism when said friction adjuster is in said second position, such that said driving rotation element and said handle shaft rotate in the line feeding-out direction and in a line winding direction when said friction adjuster is in said second position.

2. A fishing reel as claimed in claim 1, wherein said one-way clutch includes a plurality of rolling elements.

3. A fishing reel as claimed in claim 2, wherein said driving rotation element has a side surface, and wherein said first frictional retaining mechanism is disposed on said side surface of said driving rotation element, and wherein said fishing reel includes a second frictional retaining mechanism disposed between said first frictional retaining mechanism and said wind-up means, a disk spring, and a bearing, said disk spring, said bearing and said friction adjuster being arranged between said second frictional retaining mechanism and said wind-up means.

4. A fishing reel as claimed in claim 3, wherein said inner race is disposed between said first frictional retaining mechanism and said second frictional retaining mechanism, and wherein said friction adjuster is threaded onto said handle shaft.

* * * * *